No. 701,732. Patented June 3, 1902.
C. W. JAMES.
THREAD CUTTING MACHINE.
(Application filed Apr. 13, 1901.)
(No Model.) 3 Sheets—Sheet 1.
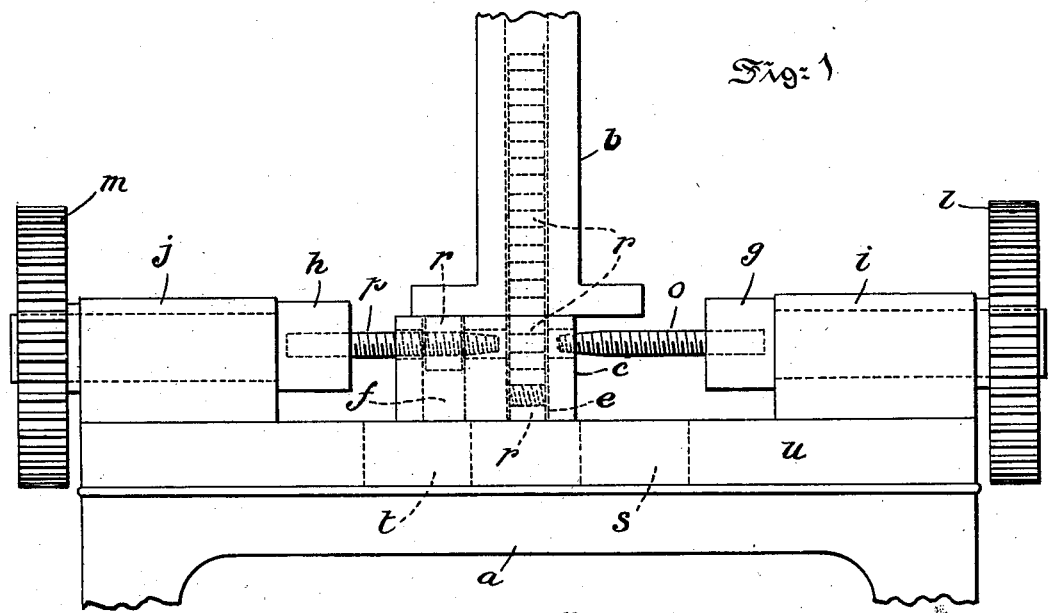
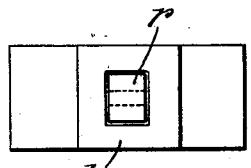
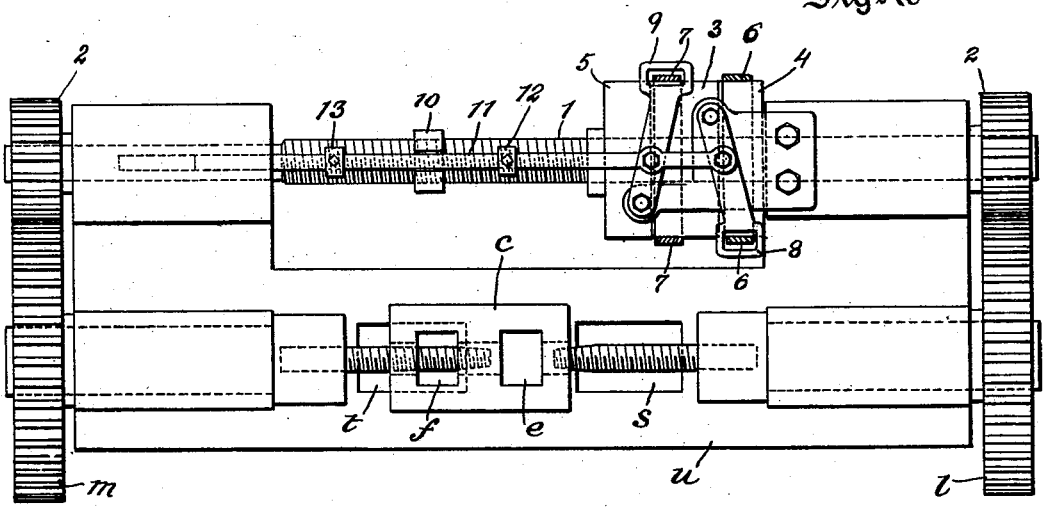
Witnesses: Inventor.
W. A. Schaefer. Charles W. James.
By his Attorney Chas. A. Rutter.

No. 701,732. Patented June 3, 1902.
C. W. JAMES.
THREAD CUTTING MACHINE.
(Application filed Apr. 13, 1901.)
(No Model.) 3 Sheets—Sheet 2.
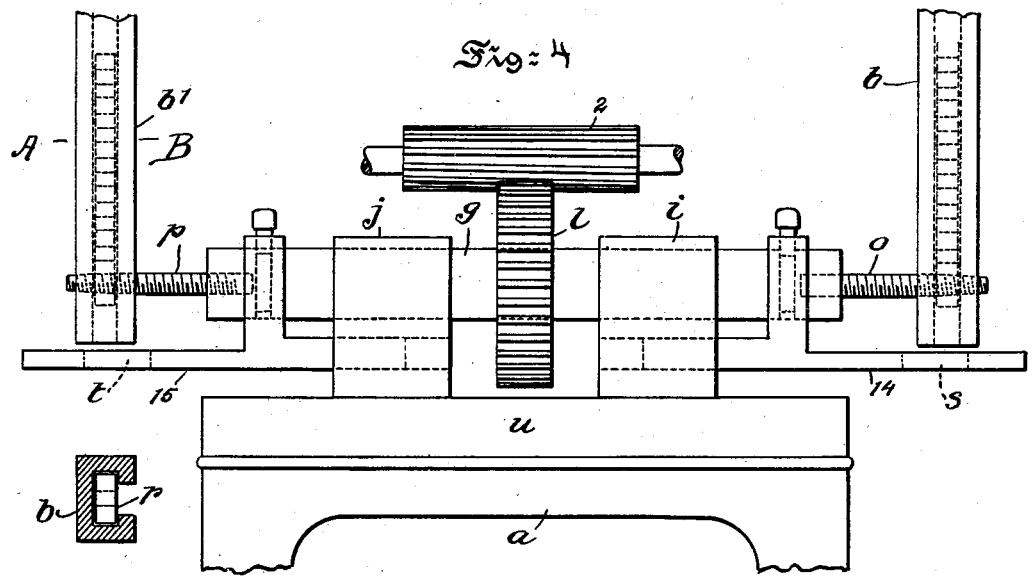
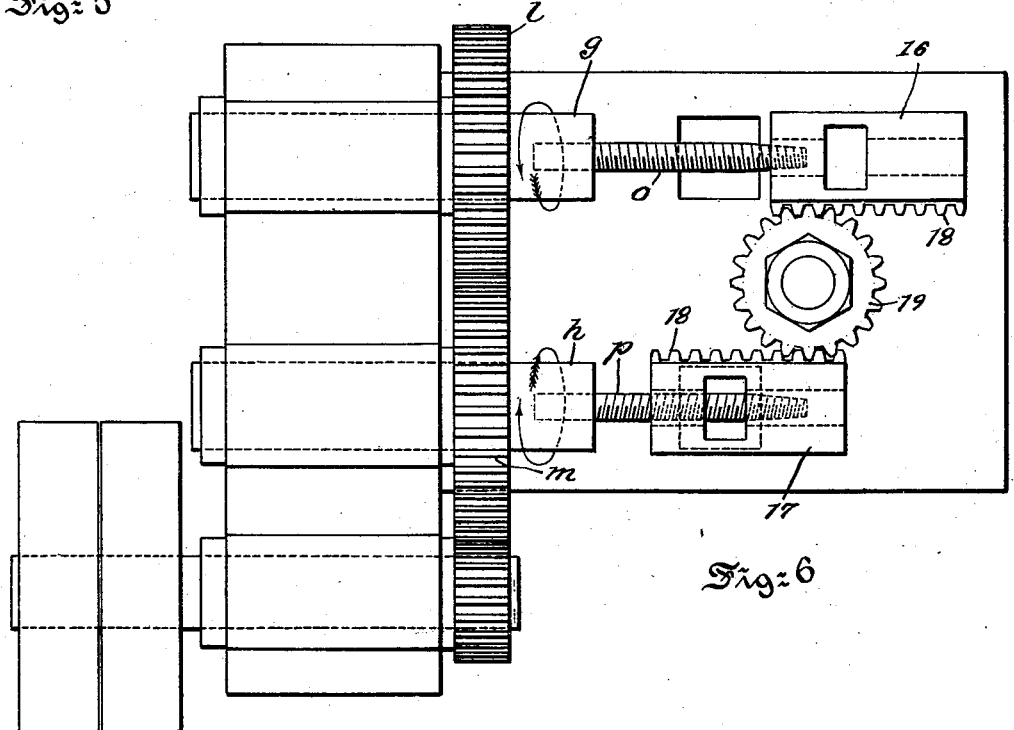
Witnesses:
W. A. Schaefer.
Inventor
Charles W. James.
By his Attorney
Chas. A. Petter.
THE NORRIS PETERS CO., PHOTO-LITHO., WASHINGTON, D. C.

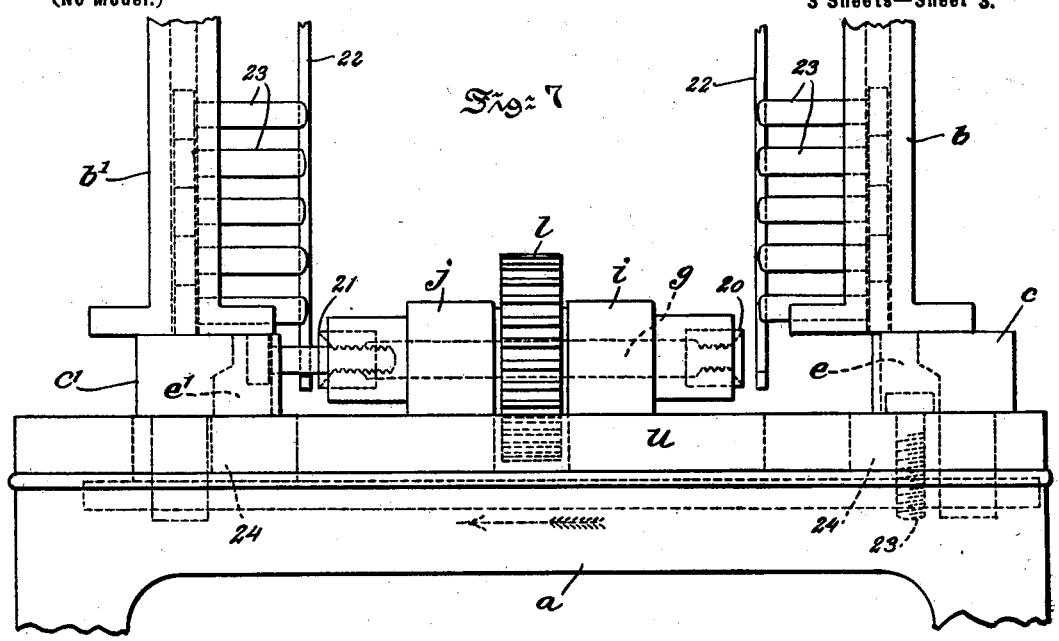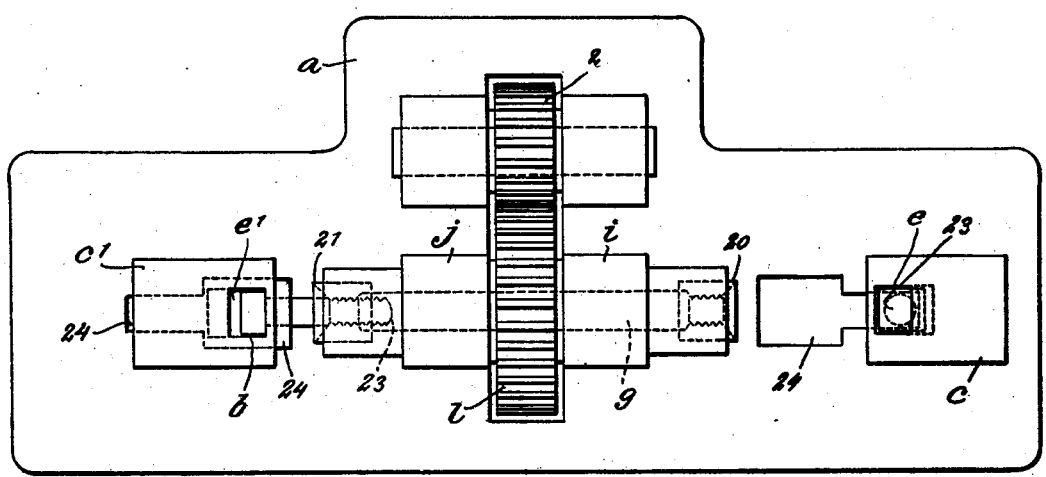

UNITED STATES PATENT OFFICE.

CHARLES W. JAMES, OF PHILADELPHIA, PENNSYLVANIA, ASSIGNOR TO THE RUSSELL, BURDSALL & WARD BOLT AND NUT COMPANY, OF PORT CHESTER, NEW YORK, A CORPORATION OF NEW YORK.

THREAD-CUTTING MACHINE.

SPECIFICATION forming part of Letters Patent No. 701,732, dated June 3, 1902.

Application filed April 13, 1901. Serial No. 55,617. (No model.)

*To all whom it may concern:*

Be it known that I, CHARLES W. JAMES, a citizen of the United States, and a resident of the city and county of Philadelphia, State of Pennsylvania, have invented certain new and useful Improvements in Thread-Cutting Machines, of which the following is a specification.

My invention relates to improvements in machines for threading nuts and bolts; and the object of my invention is to furnish a machine for threading nuts or bolts which will be entirely automatic in its operation.

In the accompanying drawings, forming part of this specification, and in which similar characters of reference indicate similar parts throughout the several views, Figure 1 is a side elevation of one form of my machine adapted to automatically tap or thread nuts; Fig. 2, a plan of Fig. 1; Fig. 3, a plan of the feed-tube, Fig. 1, which for purposes of clearness is omitted from Fig. 2; Fig. 4, a side elevation of a modification of the machine shown in Fig. 1; Fig. 5, a section through the feed-tube of Fig. 4 on line A B; Fig. 6, a plan of another modified form of machine; Fig. 7, a side elevation of machine arranged for threading bolts; Fig. 8, a plan of Fig. 7.

$a$ is a frame upon which the machine is carried; $b$, a feed-tube, which carries the nut-blanks or the heads of the bolts. In Figs. 1 and 2 the feed-tube is placed centrally upon the machine, the blanks being placed in its top and falling by gravity to its bottom. In these figures, $c$ is a sliding carriage placed below tube $b$ and furnished with two vertical perforations $e\ f$, which are adapted to register alternately with the interior of tube $b$. $g\ h$ are spindles carried by and turning in suitable bearings $i\ j$, carried by the frame $k$ of the machine. $l\ m$ are gear wheels or pulleys fast to and driving spindles $g\ h$. $o\ p$ are taps carried by spindles $g\ h$. The operation of this device is as follows: The carriage $c$ being in the position shown in the drawings and the tap $p$ having fully threaded the nut $r$, carried in opening $f$, the direction of rotation of spindle $h$ is reversed and the tap $p$, unscrewing from nut $r$, drives the carriage to the right and the tap $o$ enters the nut $r$, which is carried opposite to it in the opening $e$. As soon as the tap engages this nut they together draw the carriage to the right until the nut carried by opening $e$ is fully threaded, when the direction of rotation of tap $o$ is reversed and the carriage is driven to the left. As soon as the tap has been moved out of a nut this latter falls to the bottom of the opening in which it has been held and forms a base upon which the nut falling from tube $b$ rests during the first of its threading; but when the nut being operated upon is fully threaded, and the carriage fully moved over, the opening $e$ or $f$ is moved directly over an opening $s$ or $t$ in the base $u$ of the machine, through which the nut which has been acting as a base and gage for the one being threaded falls.

In Fig. 2 mechanism for driving and reversing the driving of the spindles and taps is shown. 1 is a shaft carrying on its ends pinions 2, which gear with gears $l\ m$; 3, a pulley fast upon and 4 5 pulleys loose upon shaft 1. 6 7 are belts—one straight, the other crossed—which alternately engage the fast pulley 3. 8 9 are belt-shifters, the former operating belt 6, the latter operating belt 7. A portion of the shaft 1 is threaded, and upon this threaded portion is a nut 10. 11 is a rod pivoted to the belt-shifters 8 9 and carrying adjustable stops 12 13. If the shaft 1 is being turned so as to drive nut 10 toward the left, there will be no movement of the shifters until nut 10 strikes stop 13. As soon, however, as this stop is engaged the rod 11 is moved to the left, and the belt 7 is moved from fast pulley 3 to loose pulley 5 and the belt 6 from loose pulley 4 to fast pulley 3, thus reversing the driving of shaft 1 and of the machine. When nut 10 engages stop 12, the driving is again reversed.

In Fig. 4 a single spindle $g$ is used, the taps $o\ p$ being carried by its ends. Two feed-tubes $b\ b'$ are also employed. $l$ is a gear fast to the middle of spindle $g$, which is driven by a long pinion 2, the driving of which may be reversed by any suitable mechanism. The bearings $i\ j$ of the spindle $g$ are carried by the bed-plate u. 14 15 are guides carried by spindle g, which are furnished with holes s t, through which the completed nut can fall. These guides serve to hold the completed nut, which acts as the guide and base for the nut to be next threaded until the tap has entered the nut to be threaded, as described in connection with Fig. 1. In Fig. 4 the spindle g has a movement to the right and left. The taps are so arranged that before one tap has left its nut the other tap has engaged its nut, the taps upon a revolution of the spindle in one direction drawing it to the right and upon a revolution in the other direction to the left.

In Fig. 6 the taps o p are carried by separate spindles g h, which are furnished with gears l m, meshing together. The blanks to be threaded are carried by carriages 16 17, which are furnished with racks 18, which gear with a gear 19, which may be revolved first in one direction and then in the other direction, so as to reciprocate the carriages and bring the nuts carried by them alternately to the taps o p, which are driven by any suitable mechanism first in one direction and then in the other.

In Figs. 7 and 8 the machine is shown adapted for threading bolts. In this case the dies 20 21 are carried upon the ends of a spindle g, and the bolts are fed down through the tubes b b', which hold their heads and permit their stems to project inward horizontally. 22 represents guides engaging the ends of the stems of the bolt 23 to insure them horizontal positions. In this machine the spindle g carries a central gear l, which is driven by a gear 2, which may be driven in any convenient manner. The feeding-tubes b b' rest upon movable carriages c c', furnished with openings e e' to receive the heads of the bolts. The carriages c c' are reciprocating, one moving in while the other is moving out. Any suitable mechanism may be employed for this movement—for instance, that shown in Fig. 2—with suitable modification for the design of the machine. The bolts after being threaded fall through the slot 24 in the bed u and are supported by the sides of the narrow part of the slot engaging their heads, as shown at the right of Figs. 7 and 8, until the carriages are moved inward, when the heads are pushed to the wide part of the slot 24, through which they fall.

It will be seen that with suitable modifications all forms of machine shown may be adapted for threading either bolts or nuts.

Having thus described my invention, I claim as new and desire to secure by Letters Patent—

1. In a thread-cutting machine, the combination of a suitable holder for articles to be threaded, a slidable carrier adapted to successively receive said articles from the holder, and a combined threading and feeding device adapted to thread the article in said carrier and reciprocate the latter toward and from a position to receive articles from the holder.

2. In a thread-cutting machine, the combination of a suitable holder for a series of articles to be threaded, a slidable carrier adapted to successively receive said articles from the holder, two combined threading and feeding devices arranged to alternately engage and thread articles in and reciprocate said carrier, and means for actuating said devices, the parts being so arranged that each threading device is maintained in engagement with the article last threaded until the other threading device has engaged the next article to be threaded, whereby each threading device acts as a guide for the other with relation to the article to be threaded by it.

3. In a thread-cutting machine, the combination of a suitable holder for articles to be threaded, a slidable carrier adapted to successively receive said articles from the holder, and two combined threading and feeding devices arranged on opposite sides of said carrier and operating to alternately thread articles therein and each reciprocating said carrier toward the other said device while being withdrawn from engagement with the article threaded by it.

4. In a thread-cutting machine, the combination with means for supplying articles to be threaded, of an apertured stand or support, two receptacles, open at the top and bottom, slidably mounted on said stand and adapted to alternately receive the articles to be threaded, and a combined threading and feeding device arranged to thread articles in said receptacles and reciprocate the latter alternately into position to receive from the holder an article to be threaded and to discharge a threaded article through an aperture in the stand or support.

5. In a thread-cutting machine, the combination of a support or stand, a holder for articles to be threaded arranged above said stand, a carrier mounted on the stand and having two passages formed therein, and two combined threading and feeding devices arranged on opposite sides of said carrier to alternately thread articles therein and to reciprocate said carrier to bring the passages therein alternately into position to receive from the holder an article to be threaded and into alinement with an aperture in the stand or support to discharge a threaded article.

CHARLES W. JAMES.

Witnesses:
GEORGE W. SELTZER,
CHARLES A. RUTTER.